United States Patent [19]

Hefner, Jr. et al.

[11] Patent Number: 4,649,190

[45] Date of Patent: Mar. 10, 1987

[54] POLY(SULFIDE CARBONATE) COMPOSITION AND METHOD FOR THEIR PREPARATION

[75] Inventors: Robert E. Hefner, Jr.; Mary N. White, both of Lake Jackson, Tex.

[73] Assignee: The Dow Chemical Company, Midland, Mich.

[21] Appl. No.: 834,723

[22] Filed: Feb. 28, 1986

Related U.S. Application Data

[63] Continuation-in-part of Ser. No. 708,478, Mar. 5, 1985, abandoned, which is a continuation-in-part of Ser. No. 557,973, Dec. 5, 1983, abandoned.

[51] Int. Cl.$^4$ .............................................. C08G 63/62

[52] U.S. Cl. .................................. 528/370; 528/364; 528/381; 528/392

[58] Field of Search ................ 528/370, 381, 364, 392

[56] References Cited

U.S. PATENT DOCUMENTS 3,055,872  9/1962  Lang .................................... 528/381
3,365,430  1/1968  Harper et al. ....................... 528/370

Primary Examiner—Harold D. Anderson
Attorney, Agent, or Firm—James G. Carter

[57] ABSTRACT

Poly(sulfide carbonate) compositions are prepared by reacting a bis(allyl)carbonate with a sulfur dihalide and optionally also with a bis- or polyallyl compound.

21 Claims, No Drawings

POLY(SULFIDE CARBONATE) COMPOSITION AND METHOD FOR THEIR PREPARATION

CROSS REFERENCE TO RELATED APPLICATION

This is a continuation-in-part of our copending application Ser. No. 708,478 filed Mar. 5, 1985, now abandoned, which is a continuation-in-part of our copending application Ser. No. 557,973 filed Dec. 5, 1983 (now abandoned).

BACKGROUND OF THE INVENTION

The present invention pertains to new curable poly(sulfide carbonate) compositions and a process for their preparation.

Reaction products of polyunsaturated allyl esters of organic carboxylic acids with sulfur chlorides are known as disclosed by Lang in U.S. Pat. No. 3,055,872. Said products contain poly(sulfide ester)s and poly(disulfide ester)s which are highly colored varying from yellow to dark amber, are of very low molecular weight, and are not curable but rather decompose at about room temperature (25° C.).

The present invention provides curable poly(sulfide carbonate) compositions which are transparent, are of moderate molecular weight, possess high elasticity and excellent film-forming ability and thermal stability at temperatures of 200° C. or higher. Both the cured and uncured poly(sulfide carbonate)s possess excellent adhesion to a variety of substrates including metals, Mylar, and glass.

SUMMARY OF THE INVENTION

The present invention concerns polymer compositions represented by the formula

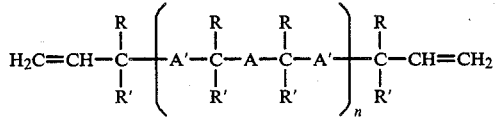
I.

wherein each R and R' are independently hydrogen or a methyl group; each A is independently a group represented by

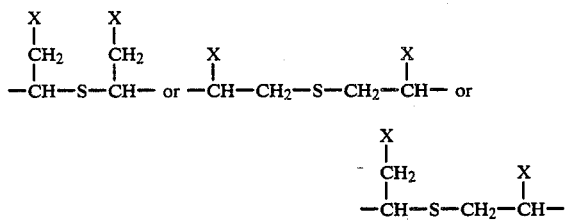

wherein each X is independently chlorine or bromine; each A' is independently selected from a group represented by the formulas

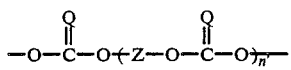
II.

wherein each Q is independently O or S, each Z is a divalent saturated aliphatic hydrocarbon group having from 1 to about 4 carbon atoms or an ether linked alkylene group represented by

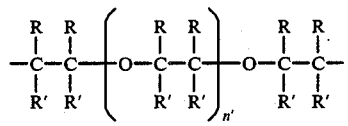

and n' has a value from zero to 4;

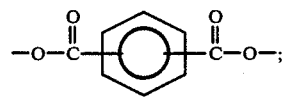
III.

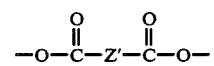
IV.

wherein Z' is a direct bond or a divalent saturated aliphatic hydrocarbon group having from 1 to about 8 carbon atoms;

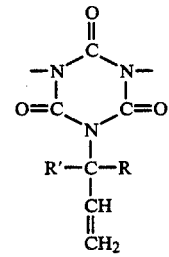
V.

wherein R and R' are as defined above; or

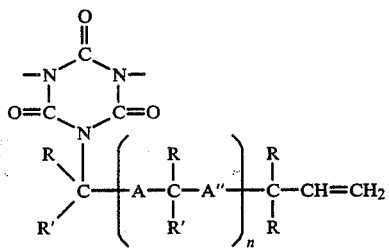
VI.

wherein A, Q, R and R' are as defined above; A" is selected from a group represented by formulas II, III, IV or V; and n has a value from about 2 to about 100; with the proviso that from about 5 to about 100, preferably from about 20 to about 80, percent of the A' groups are represented by formula II and from about zero to about 95, preferably from zero to about 20, percent of the A' groups are independently represented by the formulas III, IV, V or VI.

Another aspect of the present invention is to the product resulting from reacting (1) at least one compound represented by the formula

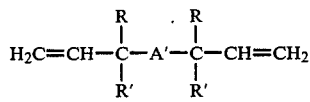
VII.

wherein A' is as defined by the formulas III, IV or V above with (2) at least one sulfur dihalide at a temperature and time sufficient to complete the reaction, of from about −40° C. to about 25° C., preferably from about −30° C. to about −10° C. for from about 1 hour to about 24 hours, preferably from about 1 hour to about 4 hours (about 3600 seconds to about 86,400 seconds, preferably about 3600 seconds to about 14,400 seconds) and wherein components (1) and (2) are employed in quantities which provides a sulfur dihalide to allyl group ratio of from about 0.3:1 to about 0.55:1, preferably from about 0.48:1 to about 0.50:1.

Another aspect of the present invention is to the cured products resulting from curing the aforementioned polymer compositions or reaction products with an effective quantity of a suitable curing agent.

DETAILED DESCRIPTION OF THE INVENTION

Suitable bis(allyl carbonate)s and bis(allylthiocarbonate)s which can be employed herein include those represented by the formula

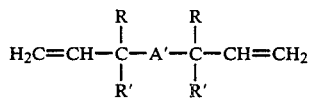

wherein A' is represented by Formula II and R and R' are as previously defined.

Particularly suitable bis(allyl carbonate)s which can be employed herein include, for example, bis(allyl)carbonate, bis(allyl)thiocarbonate, diethylene glycol bis(allyl)carbonate, diethylene glycol bis(allyl)thiocarbonate, mixtures thereof and the like.

Suitable bis- or polyallyl compounds which can be employed herein include, for example, bis- or polyallyl ester compounds such as bis(allyl)phthalate, bis(allyl)isophthalate, bis(allyl)terephthalate, the bis(allyl)ester of 1,6-hexanedicarboxylic acid, mixtures thereof and the like. A typical polyallyl compound which can be employed herein is triallylisocyanurate.

Suitable sulfur dihalides include, for example, sulfur dichloride, sulfur dibromide, mixtures thereof and the like.

Suitable solvents which can be employed in conducting the reaction between the bis(allyl carbonate) or bis(allyl thiocarbonate) compounds and the sulfur dihalide, if desired, includes, for example, halogenated aliphatic compounds, aromatic compounds, esters and the like. Particularly suitable solvents include, for example, methylene chloride, chloroform, ethyl acetate, benzene, mixtures thereof and the like.

In the process of this invention, the bis(allyl)carbonate, sulfur dihalide and bis or polyallyl compound, if any, may be added in any order and may be added in increments or continuously. In a preferred process, the bis(allyl)carbonate and bis or polyallyl compound, if any, are added either neat or admixed with a solvent to the sulfur dihalide which is either neat or admixed with a solvent. In a most preferred process, the sulfur dihalide which is either neat or admixed with a solvent is added to the bis(allyl)carbonate and bis or polyallyl compound, if any, which is either neat or admixed with solvent. When a bis or polyallyl compound is used it can be added to the reaction mixture after substantial reaction of the bis(allyl)carbonate and sulfur dihalide have already occurred.

Reaction temperatures are suitably from about −40° C. to about 25° C., preferably from about 0° C. to about 10° C., most preferably from −30° C. to about −10° C. The reaction is preferably run in the absence of light. The reaction may be favored by vacuum distillation of the solvent once all reactants have been substantially reacted.

Catalysts suitable for curing the poly(sulfide carbonate)s include the free radical forming catalysts. Suitable such catalysts include, for example, the acyl peroxides such as benzoyl peroxide, the peroxydicarbonates such as di(n-propyl)peroxydicarbonate and the peroxyesters such as alpha-cumylperoxy neodecanoate. It is frequently of value to add accelerators such as cobalt naphthenate, dimethylaniline, and the like. A most preferred catalyst combination for curing the poly(sulfide carbonate)s is a combination of 2,5-dimercapto-1,3,4-thiadiazole and N-phenyl-3,5-diethyl-2-propyl-1,4-dihydropyridine.

The following examples are illustrative of the invention but are not to be construed as to limiting the scope thereof in any manner.

EXAMPLE 1

Preparation of a Poly(sulfide carbonate) of bis(allyl)carbonate and SCl$_2$ bis(Allyl)carbonate (0.3725 mole, 52.9 grams) in dry methylene chloride (350 milliliters) was cooled to −25° C. and maintained with stirring under a dry nitrogen stream. Sulfur dichloride (0.3725 mole, 38.4 grams) which had been freshly vacuum distilled over phosphorus pentachloride (0.5 percent) was added dropwise and so as to maintain the reaction temperature between −25° and −20° C. After completion of the sulfur dichloride addition, stirring was stopped, the reactor was stoppered using a drying tube and then maintained at −20° C. for an additional 12 hours (43200 s). After warming the reaction product to room temperature (25° C.), methylene chloride solvent was removed by rotary evaporation under vacuum. The crude copolymer was redissolved in methylene chloride then precipitated by pouring into rapidly stirred isopropanol. The copolymer was recovered by filtration from the solvents and then dried under vacuum at 50° C. A total of 89.5 grams of the transparent, highly elastic copolymer was thus obtained. Nuclear magnetic resonance spectroscopic analysis demonstrated that in excess of 95 percent of the allyl groups had reacted with sulfur dichloride to provide the following pair of copolymer linkages in the indicated amounts:

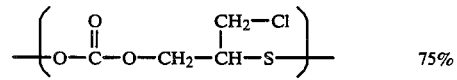 75%

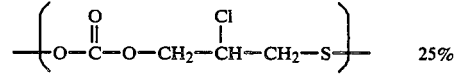 25%

Gel permeation chromatography using polystyrene standards demonstrated an average molecular weight of 20,542 and a polydispersity ratio of 2.51. Infrared spectrophotometric analysis of a neat film of the copolymer confirmed the expected structure for the allyl terminated poly(sulfide carbonate).

A portion (9.50 milligrams) of the poly(sulfide carbonate) prepared above was analyzed by differential scanning calorimetry (DSC). An initial temperature of −20° C. was used with a scan rate of 10° C. per minute. The glass transition temperature was found to be 9.2° C.

A portion (11.90 milligrams) of the poly(sulfide carbonate) prepared above was analyzed by thermal gravimetric analysis (TGA) under a nitrogen atmosphere. A second portion (16.30 milligrams) of the poly(sulfide carbonate) was analyzed by thermal gravimetric analysis under an atmosphere of air. Both the nitrogen and air were metered at a rate of 30 cubic centimeters per minute (0.5 cc/s). A heating rate of 10° C. per minute (0.167° C./s) was used. The lower temperature limit was 50° C. while the upper temperature limit was 450° C. The results are given in Table I.

TABLE I

| Temperature (°C.) | Percent Weight Loss | |
|---|---|---|
| | In Air | In Nitrogen |
| 217 | 2.0 | 1.0 |
| 250 | 7.0 | 4.0 |
| 300 | 79.0 | 60.0 |
| 312 | 92.0 | 90.0 |
| 324 | 94.0 | 95.0 |
| 338 | 95.0 | 96.0 |

EXAMPLE 2

A portion (1.0 gram) of the poly(sulfide carbonate) of Example 1 was placed between two pieces of Mylar film and then pressed at 150° C. and 5000 psi (34.45 MPa) for 10 minutes (600 s). The resulting Mylar film layers were tightly bonded and could not be pulled apart by hand.

EXAMPLE 3

Preparation of a Poly(sulfide carbonate) of Diethylene glycol bis(allyl)carbonate and $SCl_2$ Diethylene glycol bis(allyl)carbonate (0.19 mole, 51.0 grams) in dry methylene chloride (50 milliliters) was cooled to −30° C. and maintained with stirring under a dry nitrogen stream. Sulfur dichloride (0.19 mole, 19.0 grams) which had been freshly vacuum distilled over phosphorus pentachloride (0.5 percent) was added dropwise and so as to maintain the reaction temperature between −30° and −25° C. After completion of the sulfur dichloride addition, the reaction temperature was maintained at −30° C. for an additional hour (3600 s) and then the reaction product was diluted with additional methylene chloride (100 milliliters). After warming the reaction product to room temperature (25° C.) the copolymer was precipitated by pouring into rapidly stirred methanol (500 milliliters). The copolymer was recovered by filtration from the solvents and then dried under vacuum at 60° C. A total of 68.0 grams of the transparent, highly elastic copolymer was thus obtained. Gel permeation chromatography using polystyrene standards demonstrated an average molecular weight of 21,000 and a polydispersity ratio of 2.10. Infrared spectrophotometric analysis of a neat film of the copolymer and nuclear magnetic resonance spectroscopic analysis both confirmed the expected structure for the allyl terminated poly(sulfide carbonate).

EXAMPLE 4

Preparation of a Poly(sulfide carbonate) of bis(allyl)carbonate, Triallylisocyanurate and $SCl_2$ bis(Allyl)carbonate (0.330 mole, 46.9 grams) in dry ethyl acetate (300 milliliters) was cooled to −30° C. and maintained with stirring under a dry nitrogen stream. Sulfur dichloride (0.280 mole, 28.8 grams) which had been freshly vacuum distilled over phosphorus pentachloride (0.5 percent) was added dropwise and so as to maintain the reaction temperature between −25° and −20° C. After completion of the sulfur dichloride addition, triallyl isocyanurate (0.0175 mole, 4.36 grams) was added followed by addition of another portion of sulfur dichloride (0.050 mole, 5.2 grams). The reaction temperature was maintained at −20° C. for an additional hour (3600 s). After warming the reaction product to room temperature (25° C.), ethyl acetate solvent was removed by rotary evaporation under vacuum. The crude copolymer was redissolved in ethyl acetate then precipitated by pouring into rapidly stirred isopropanol. The copolymer was recovered by filtration from the solvents and then dried under vacuum at 40° C. A total of 83.4 grams was thus obtained. Gel permeation chromatography using polystyrene standards demonstrated an average molecular weight of 28,000 and a polydispersity ratio of 3.39. Infrared spectrophotometric analysis of a neat film of the copolymer and nuclear magnetic resonance spectroscopic analysis both confirmed the expected structure for the allyl terminated poly(sulfide carbonate).

EXAMPLE 5

Qualitative Determination of Adhesion of a Poly(sulfide carbonate) to Various Substrates Portions (0.50 gram) of the poly(sulfide carbonate) of Example 1 were applied at room temperature (25° C.) to aluminum, Mylar, Saran, cold-rolled steel, polyethylene, glass, and paper. The method of ASTM D3808 was used to determine qualitative adhesion to each respective substrate. The results are reported in Table II.

TABLE II

| Substrate | Mode of Failure | |
|---|---|---|
| | Adhesive | Cohesive |
| Aluminum | | X |
| MYLAR | | X |
| SARAN | X | |
| Cold-rolled Steel | | X |
| Polyethylene | X | |
| Glass | | X |
| Paper | | X |

EXAMPLE 6

A portion (50.0 grams) of the poly(sulfide carbonate) of Example 1 was blended with a catalyst system consisting of 3 phr of Echo-S (from Hercules, Inc., 2,5-dimercapto-1,3,4-thiadiazole) and 1 phr of Vanax 808 (from T. R. Vanderbilt Co., N-phenyl-3,5-diethyl-2-propyl-1,4-dihydropyridine). Blending of the copolymer and catalysts was accomplished using a Haake-Buchler Torque Rheometer which was maintained at 87° C., 70 rpm for 10 minutes (600 s). The copolymer was cured in a glass dish for 16 hours (57600 s) at 100° C. The cured product was a transparent, light amber-colored, elastic solid which was tightly bonded to the glass dish. The cured copolymer was insoluble in methylene chloride.

COMPARATIVE EXPERIMENT A

Bis(allyl)carbonate (0.10 mole, 14.2 grams) was cooled to 10° C. and maintained with stirring under a dry nitrogen stream. Sulfur chlorides (0.10 mole, 11.2 grams) composed of 71 percent by weight (pbw) of sulfur dichloride and 29 pbw of sulfur monochloride was added dropwise and so as to maintain the reaction temperature between 25° and 29° C. A viscous, yellow-colored liquid product was obtained. Nuclear magnetic spectroscopic analysis demonstrated that 82 percent of the allyl groups had reacted with the sulfur chlorides. Infrared spectrophotometric analysis of a neat film of the product showed the presence of a significant amount of chloroformate groups. Further characterization of the product was not possible due to rapid decomposition at room temperature (25° C.).

COMPARATIVE EXPERIMENT B

Bis(methallyl)carbonate (0.15 mole, 26.0 grams) in dry methylene chloride (25 milliliters) was cooled to −25° C. and maintained with stirring under a dry nitrogen stream. Sulfur dichloride (0.15 mole, 15.5 grams) which had been freshly vacuum distilled over phosphorus pentachloride (0.5 percent) was added dropwise and so as to maintain the reaction temperature between −25° and −20° C. After completion of the sulfur dichloride addition, the reaction temperature was maintained at −25° C. for an additional hour (3600 s). The resulting reaction product was worked up using the method of Example 3. A total of 0.25 gram of a grease-like product was thus obtained.

EXAMPLE 7

Copolymerization of bis(Allyl)carbonate and Diallyl Adipate Mixture with Sulfur Dichloride bis(Allyl)carbonate (0.00704 mole, 1 gram) and diallyl adipate (0.0841 mole, 19 grams) in dichloromethane (40 milliliters) were stirred with cooling in a 50 milliliter flask. Sulfur dichloride (0.0911 mole, 9.4 grams) which had been freshly distilled over 0.5 percent by weight phosphorous pentachloride was added dropwise to the flask while maintaining the temperature between −30° and 31 25° C. After the addition was completed, the reactor was allowed to remain at −30° C. for an additional hour (3600 s). The copolymer product was precipitated by addition of methanol and the solvent was removed under reduced pressure at 60° C.

COMPARATIVE EXPERIMENT C

Copolymerization of Diallyl Adipate with Sulfur Dichloride (70 pbw) and Sulfur Monochloride (30 pbw) Mixture Diallyl adipate (0.0885 mole, 20 grams) in dichloromethane (40 milliliters) was stirred with cooling in a 50 milliliter flask in which was maintained a nitrogen atmosphere. A sulfur dichloride (70 percent by weight) and sulfur monochloride (30 percent by weight) mixture (10.2 grams) was added dropwise to the flask while maintaining the temperature between 15° C. and 20° C. After the addition was completed, the reactor was allowed to remain at 15° C. for an additional hour (3600 s). The copolymer product was precipitated by addition of methanol and the solvent was removed under reduced pressure at 60° C.

COMPARATIVE EXPERIMENT D

Copolymerization of bis(Allyl)carbonate and Diallyl Adipate Mixture with Sulfur Dichloride (95 pbw) and Sulfur Monochloride (5 pbw) Mixture bis(Allyl)carbonate (0.00704 mole, 1 gram) and diallyl adipate (0.0841 mole, 19 grams) in dichloromethane (40 milliliters) were stirred with cooling in a 50 milliliter flask. A sulfur dichloride ($SCl_2$) (95 percent by weight) and sulfur monochloride ($S_2Cl_2$) (5 percent by weight) mixture (0.0911 mole, 9.5 grams) was added dropwise to the flask while maintaining the temperature between −30° C. and −25° C. After the addition was completed, the reactor was allowed to remain at −30° C. for an additional hour (3600 s). The copolymer product was precipitated by addition of methanol and the solvent was removed under reduced pressure at 60° C.

COMPARATIVE EXPERIMENT E

Copolymerization of bis(Allyl)carbonate and Diallyl Adipate Mixture with Sulfur Dichloride (70 pbw) and Sulfur Monochloride (30 pbw) Mixture bis(Allyl)carbonate (0.00704 mole, 1 gram) and diallyl adipate (0.0841 mole, 19 grams) in dichloromethane (40 milliliters) were stirred with cooling in a 50 milliliter flask in which was maintained a nitrogen atmosphere. A sulfur dichloride (70 percent by weight) and sulfur monochloride (30 percent by weight) mixture (10.2 grams) was added dropwise to the flask while maintaining the temperature between 15° C. and 20° C. After the addition was completed, the reactor was allowed to remain at 15° C. for an additional hour (3600 s). The copolymer product was precipitated by addition of methanol and the solvent was removed under reduced pressure at 60° C.

EXAMPLE 8

Thermal Stability Testing

Weighed portions of the copolymers of Example 7, Comparative Experiments C, D and E were placed in individual aluminum dishes and maintained in a forced air, convection-type oven under an air atmosphere at 60° C. for 24 hours (86,400 s), 120° C. for 24 hours (86,400 s) and then 140° C. for 120 hours (432,000 s). Each sample was weighed after 24, 48, 72, 120 and 168 hours of thermal exposure and the percent weight loss calculated. The results are summarized in the following Table III.

TABLE III

| EXAMPLE NUMBER OR COMPARATIVE EXPERIMENT LETTER | PERCENT WEIGHT LOSS AFTER THE INDICATED TIME | | | | |
|---|---|---|---|---|---|
| | 24 HRS. | 48 HRS. | 72 HRS. | 120 HRS. | 168 HRS. |
| 7 | 2.1 | 5.64 | 8.26 | 11.26 | 14.16 |
| C* | 7.23 | 14.84 | 17.75 | 21.71 | 23.98 |
| D* | 1.52 | 9.52 | 15.38 | 20.2 | 24.0 |
| E* | 3.28 | 8.38 | 12.47 | 16.55 | 20.13 |

*Not an example of the present invention

We claim:

1. Polymer composition represented by the formula

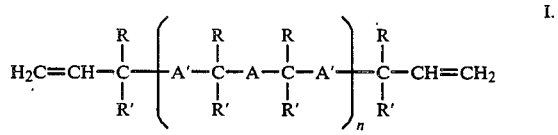

I.

wherein each R and R' are independently hydrogen or a methyl group; each A is independently a group represented by $$\begin{array}{ccc}
\text{X} & \text{X} \\
| & | \\
\text{CH}_2 & \text{CH}_2 & \text{X} & \text{X} \\
| & | & | & | \\
-\text{CH}-\text{S}-\text{CH}- & \text{or} & -\text{CH}-\text{CH}_2-\text{S}-\text{CH}_2-\text{CH}- & \text{or}
\end{array}$$

$$\begin{array}{c}
\text{X} \\
| \\
\text{CH}_2 \quad \text{X} \\
| \quad | \\
-\text{CH}-\text{S}-\text{CH}_2-\text{CH}-
\end{array}$$

wherein each X is independently chlorine or bromine; each A' is independently selected from a group represented by the following formulas II, III, IV, V or VI $$-\text{O}-\overset{\text{O}}{\overset{\|}{\text{C}}}-\text{O}\text{+}\text{Z}-\text{O}-\overset{\text{O}}{\overset{\|}{\text{C}}}-\text{O}\text{)}_{n'}- \qquad \text{II.}$$

wherein each Q is independently O or S, each Z is a divalent saturated aliphatic hydrocarbon group having from 1 to about 4 carbon atoms or an ether linked alkylene group represented by $$-\overset{R}{\underset{R'}{\overset{|}{\text{C}}}}-\overset{R}{\underset{R'}{\overset{|}{\text{C}}}}-\left(\text{O}-\overset{R}{\underset{R'}{\overset{|}{\text{C}}}}-\overset{R}{\underset{R'}{\overset{|}{\text{C}}}}\right)_{n'}-\text{O}-\overset{R}{\underset{R'}{\overset{|}{\text{C}}}}-\overset{R}{\underset{R'}{\overset{|}{\text{C}}}}-$$

and n' has a value from zero to 4;

$$-\text{O}-\overset{\text{O}}{\overset{\|}{\text{C}}}-\underset{\bigcirc}{}-\overset{\text{O}}{\overset{\|}{\text{C}}}-\text{O}-; \qquad \text{III.}$$

$$-\text{O}-\overset{\text{O}}{\overset{\|}{\text{C}}}-\text{Z}'-\overset{\text{O}}{\overset{\|}{\text{C}}}-\text{O}- \qquad \text{IV.}$$

wherein Z' is a direct bond or Z' is a divalent saturated aliphatic hydrocarbon group having from 1 to about 8 carbon atoms;

V.

(structure with triazine ring: −N, C=O, O=C, N, C=O, N−, R'−C−R, CH=CH₂)

wherein R and R' are as defined above; or

VI.

(structure with triazine ring and polymeric chain with A, C, A", R, R' groups and CH=CH₂ terminus)

wherein A, Q, R and R' are as defined above; A" is selected from a group represented by formulas II, III, IV or V; and n has a value from about 2 to about 100; with the proviso that from 5 to 100, percent of the A' groups are represented by formula II and from zero to 95, percent of the A' groups are independently represented by the formulas III, IV, V or VI.

2. A polymer composition of claim 1 wherein
 (i) each Q is oxygen;
 (ii) each R and R' are hydrogen; and
 (iii) from about 80 to about 100 percent of the A' groups are represented by formula II and from zero to about 20 percent of the A' groups are represented by formulas III, IV, V or VI.

3. A polymer composition of claim 2 wherein each X is chlorine and n' in formula II is zero.

4. A composition of claim 3 wherein up to 20 percent of the A' groups are represented by formulas V or VI or a mixture thereof.

5. A composition of claim 3 wherein up to 20 percent of the A' groups are represented by formula III.

6. A composition of claim 3 wherein up to 20 percent of the A' groups are represented by formula IV.

7. A composition resulting from reacting in the presence or absence of a suitable reaction medium (A) at least one compound represented by the formula $$\text{H}_2\text{C}=\text{CH}-\overset{R}{\underset{R'}{\overset{|}{\text{C}}}}-\text{A}'-\overset{R}{\underset{R'}{\overset{|}{\text{C}}}}-\text{CH}=\text{CH}_2 \qquad \text{VII.}$$

wherein each A' is independently selected from a group represented by the following formulas II, III, IV or V $$-\text{O}-\overset{\text{O}}{\overset{\|}{\text{C}}}-\text{O}\text{+}\text{Z}-\text{O}-\overset{\text{O}}{\overset{\|}{\text{C}}}-\text{O}\text{)}_{n'}- \qquad \text{II.}$$

wherein each Q is independently O or S, each Z is a divalent saturated aliphatic hydrocarbon group having from 1 to about 4 carbon atoms or an ether linked alkylene group represented by $$-\overset{R}{\underset{R'}{\overset{|}{\text{C}}}}-\overset{R}{\underset{R'}{\overset{|}{\text{C}}}}-\left(\text{O}-\overset{R}{\underset{R'}{\overset{|}{\text{C}}}}-\overset{R}{\underset{R'}{\overset{|}{\text{C}}}}\right)_{n'}-\text{O}-\overset{R}{\underset{R'}{\overset{|}{\text{C}}}}-\overset{R}{\underset{R'}{\overset{|}{\text{C}}}}-$$

and n' has a value from zero to 4;

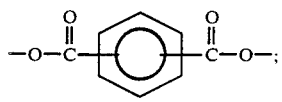

III.

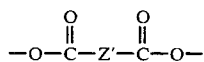

IV.

wherein Z' is a direct bond or Z' is a divalent saturated aliphatic hydrocarbon group having from 1 to about 8 carbon atoms;

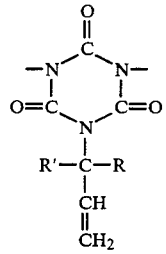

V.

with the proviso that from 5 to 100, percent of the A' groups are represented by formula II and from zero to 95, percent of the A' groups are independently represented by the formulas III, IV or V; with (B) at least one sulfur dihalide at a temperature and time sufficient to complete the reaction, and wherein components (A) and (B) are employed in quantities which provides a halogen to allyl group ratio of from about 0.3:1 to about 0.55:1.

8. A composition of claim 7 wherein
(i) each Q is oxygen;
(ii) each R and R' are hydrogen; and
(iii) from about 80 to about 100 percent of the A' groups are represented by formula II and from zero to about 20 percent of the A' groups are represented by formulas III, IV, V or VI;

(iv) the sulfur dihalide to allyl group ratio is from about 0.48:1 to about 0.50:1;
(v) the reaction is conducted at a temperature of from about $-40°$ to about $25°$ C. for from about 1 hour to about 24 hours.

9. A composition of claim 8 wherein each X is chlorine and n' in formula II is zero.

10. A composition of claim 9 wherein up to 20 percent of the A' groups are represented by formulas V or VI or a mixture thereof.

11. A composition of claim 9 wherein up to 20 percent of the A' groups are represented by formula III.

12. A composition of claim 9 wherein up to 20 percent of the A' groups are represented by formula IV.

13. A composition of claim 9 wherein bis(allyl)carbonate is reacted with sulfur dichloride.

14. A composition of claim 9 wherein diethylene glycol bis(allyl)carbonate is reacted with sulfur dichloride.

15. A composition of claim 10 wherein a mixture of bis(allyl)carbonate and triallylisocyanurate is reacted with sulfur dichloride.

16. A composition of claim 11 wherein a mixture of bis(allyl)carbonate and at least one of diallylphthalate, diallylisophthalate or diallylterephthalate is reacted with sulfur dichloride.

17. A composition of claim 12 wherein a mixture of bis(allyl)carbonate and bis(allyl)ester of 1,6-hexanedicarboxylic acid is reacted with sulfur dichloride.

18. A composition resulting from curing a polymer composition or reaction product of claims 1, 2, 3, 4, 5, 6, 7, 8, 9, 10, 11, 12, 13, 14, 15, 16 or 17 with an effective quantity of a suitable curing agent.

19. A composition of claim 18 wherein said curing agent is an organic peroxide or an organic peroxide containing an accelerator therefor.

20. A composition of claim 19 wherein said organic peroxide is benzoyl peroxide and said accelerator is dimethylaniline.

21. A composition of claim 18 wherein said curing agent is a mixture of 2,5-dimercapto-1,3,4-thiadiazole and N-phenyl-3,5-diethyl-2-propyl-1,4-dihydropyridine.

* * * * *